(12) United States Patent
Saxberg

(10) Patent No.: US 11,639,451 B2
(45) Date of Patent: May 2, 2023

(54) WASH-OFF LABEL

(71) Applicant: UPM Raflatac Oy, Tampere (FI)

(72) Inventor: Tom Saxberg, Tampere (FI)

(73) Assignee: UPM RAFLATAC OY, Tampere (FI)

( * ) Notice: Subject to any disclaimer, the term of this patent is extended or adjusted under 35 U.S.C. 154(b) by 70 days.

(21) Appl. No.: 15/734,300

(22) PCT Filed: Jun. 7, 2019

(86) PCT No.: PCT/FI2019/050442
§ 371 (c)(1),
(2) Date: Dec. 2, 2020

(87) PCT Pub. No.: WO2019/234305
PCT Pub. Date: Dec. 12, 2019

(65) Prior Publication Data
US 2021/0222032 A1 Jul. 22, 2021

(30) Foreign Application Priority Data

Jun. 8, 2018 (FI) ...................................... 20185530

(51) Int. Cl.
*C09J 7/38* (2018.01)
*G09F 3/00* (2006.01)
(Continued)

(52) U.S. Cl.
CPC ................. *C09J 7/385* (2018.01); *C09J 7/22* (2018.01); *C09J 7/255* (2018.01); *C09J 7/29* (2018.01);
(Continued)

(58) Field of Classification Search
CPC ..... C09J 7/385; C09J 7/22; C09J 7/255; C09J 7/29; C09J 2203/334; C09J 2301/302;
(Continued)

(56) References Cited

U.S. PATENT DOCUMENTS

2007/0104931 A1   5/2007   Ito et al.
2009/0038737 A1*  2/2009   Previty .................... B32B 1/02
                                                          156/86
(Continued)

FOREIGN PATENT DOCUMENTS

CN   107610585 A   1/2018
EP    3326809 A1   5/2018
(Continued)

OTHER PUBLICATIONS

International Search Report for the corresponding International Application No. PCT/FI2019/050442, International Filing Date: Jun. 7, 2019, dated Sep. 27, 2019; 5 pages.
Written Opinion for the corresponding International Application No. PCT/FI2019/050442, International Filing Date Jun. 7, 2019, dated Sep. 27, 2019; 6 pages.

*Primary Examiner* — Patricia L. Nordmeyer
(74) *Attorney, Agent, or Firm* — Cantor Colburn LLP

(57) ABSTRACT

The invention relates to a wash-off label. According to an embodiment, the face film of the wash-off label comprises biaxially oriented plastic film and configured to shrink asymmetrically so that a difference between the shrinkage of the film in machine direction and in transverse direction is at least 55%, when exposed to washing liquid comprising caustic soda and having temperature in the range of 65-85° C. for equal or less than 5 minutes. The invention further relates to a use of the wash-off label and to a labelled article.

9 Claims, 2 Drawing Sheets

(51) Int. Cl.
*G09F 3/10* (2006.01)
*C09J 7/22* (2018.01)
*G09F 3/02* (2006.01)
*C09J 7/29* (2018.01)
*C09J 7/25* (2018.01)

(52) U.S. Cl.
CPC .............. *G09F 3/0291* (2013.01); *G09F 3/10* (2013.01); *C09J 2203/334* (2013.01); *C09J 2301/302* (2020.08); *C09J 2467/006* (2013.01); *G09F 2003/0257* (2013.01); *G09F 2003/0273* (2013.01); *Y10T 428/2826* (2015.01)

(58) Field of Classification Search
CPC .... C09J 2467/006; G09F 3/0291; G09F 3/10; G09F 2003/0257; G09F 2003/0273; Y10T 428/2826
See application file for complete search history.

(56) References Cited

U.S. PATENT DOCUMENTS

| | | | |
|---|---|---|---|
| 2011/0033700 A1* | 2/2011 | Caylus | G09F 3/10 428/354 |
| 2012/0199274 A1* | 8/2012 | Mitchell | B32B 7/00 156/182 |
| 2013/0213581 A1 | 8/2013 | Taylor et al. | |
| 2014/0054193 A1* | 2/2014 | McKillip | B32B 27/32 206/497 |
| 2014/0360658 A1 | 12/2014 | Schneider et al. | |
| 2015/0060320 A1 | 3/2015 | Mitchell et al. | |

FOREIGN PATENT DOCUMENTS

| | | |
|---|---|---|
| ES | 2212410 T3 | 7/2004 |
| WO | 2011036349 A1 | 3/2011 |

* cited by examiner

WASH-OFF LABEL

CROSS-REFERENCE TO RELATED APPLICATIONS

This application is a National Stage application of PCT/FI2019/050442, filed Jun. 7, 2019, which claims benefit of Finnish Application No. 20185530 filed on Jun. 8, 2018, both of which are incorporated by reference herein in their entirety.

TECHNICAL FIELD

The application relates to adhesive labels. Especially to wash-off labels being removable form the surface of an item labelled during subsequent washing process.

BACKGROUND

It is general practice to apply a label to a surface of an item to provide decoration, and/or to display information about the product being sold, such as the content of the item, a trade name or logo. Alternative type of labelling technologies and labels are available, such as pressure-sensitive, wet glue, wrap around and shrink sleeve labels. The containers, such as bottles in the beverage industry, are generally re-used or recycled and thus there is a need for labels which are easily removed from the surface of the container during conventional washing processes such as hot dilute caustic soda. Thus, removable labels are an important topic, for example, in beverage industry.

SUMMARY

It is an object of this application to provide an adhesive label, which is subsequently removable from the surface labelled. Another object is to provide a combination of a label and an item, wherein the item is afterwards recycled or reused.

According to an embodiment a wash-off label comprising a face film and an adhesive layer for adhering the label to the surface of an item to be labelled, is provided. The face film is biaxially oriented plastic film and configured to shrink asymmetrically so that a difference between the shrinkage of the film in machine direction and in transverse direction is at least 55%, when exposed to washing liquid comprising caustic soda and having temperature in the range of 65-85° C. for equal or less than 5 minutes.

One embodiment provides a combination of a wash-off label and an article, such as a beverage bottle.

One embodiment provides a use of a wash-off label for labelling of a beverage bottle.

Further embodiments are presented in the dependent claims.

According to an example, the difference between the shrinkage of the film in machine direction and in transverse direction is at least 65%.

According to an example, the biaxially oriented plastic film comprises glycol modified polyethylene terephthalate.

According to an example, the biaxially oriented plastic film is a monolayer film.

According to an example, the biaxially oriented plastic film exhibits shrinkage of between 20 and 80% in the transverse direction of the film.

According to an example, the adhesive layer comprises permanent pressure sensitive adhesive.

According to an example, the adhesive layer comprises acrylic dispersion adhesive or acrylic UV hot-melt adhesive.

BRIEF DESCRIPTION OF THE DRAWINGS

In the following some examples and embodiments of the invention will be described in more detail with reference to appended drawings, in which.

DETAILED DESCRIPTION

In this description and claims, the percentage values relating to an amount of raw materials are percentages by weight (wt. %) unless otherwise indicated. The following reference numbers and denotations are used in this application:

Sx, Sy, Sz orthogonal directions,
TD transverse direction,
CD cross direction,
MD machine direction,
DR draw ratio,
MRK1 graphics,
L1 length of a label film prior to shrinking,
w1 width of a label film prior to shrinking,
d1 thickness of a label film prior to shrinking,
L2 length of a shrunk label film,
w2 width of a shrunk label film,
d2 thickness of a shrunk label film,
1 a shrinkable face film,
2 an adhesive label,
4 an adhesive layer,
5 a release liner,
6 a release layer,
7 a substrate,
8 a label laminate,
10 a shrunk face film,
100 an item,
101 a labelled item.

Figure 2:
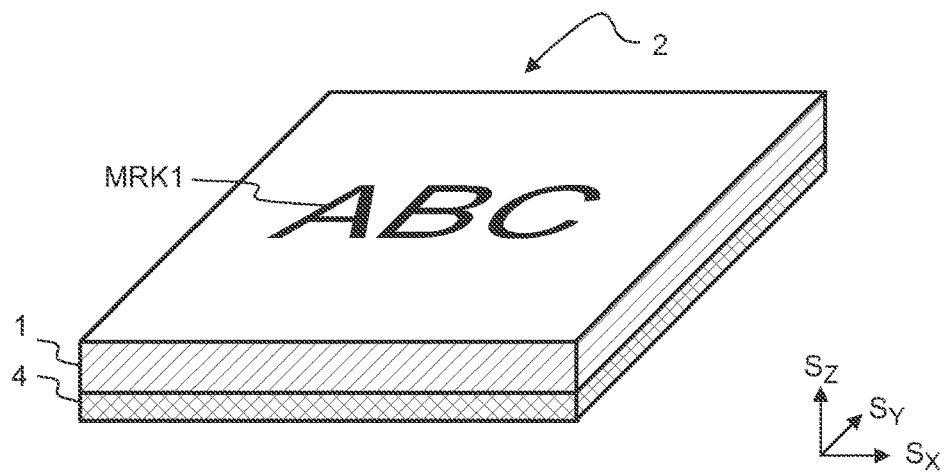
FIG. 2 shows an example embodiment of a printed label.

In this application term "label" refers to a piece of material, which is used for labelling of an item. Label may be used to identify something. Label may be attached to an article. An article may be a package, such as a bottle. In other words, label is suitable to be applied to a surface of an item to provide decoration, and/or to display information about the product being sold, such as content information, a trade name, a logo, a barcode, or any other graphics. With reference to FIG. 2, a label 2 comprises a face film 1, an adhesive layer 4, and at least some graphics MRK1 on a surface of the face film. A face film may also be referred to as a label film. The graphics may comprise, for example, printed information and/or decoration. A face film comprises a first surface and a second surface. At least one of the surfaces includes graphics. One of the surfaces includes adhesive. The adhesive is used to enable the label to be attached to an item, an article or a container.

Figure 1:
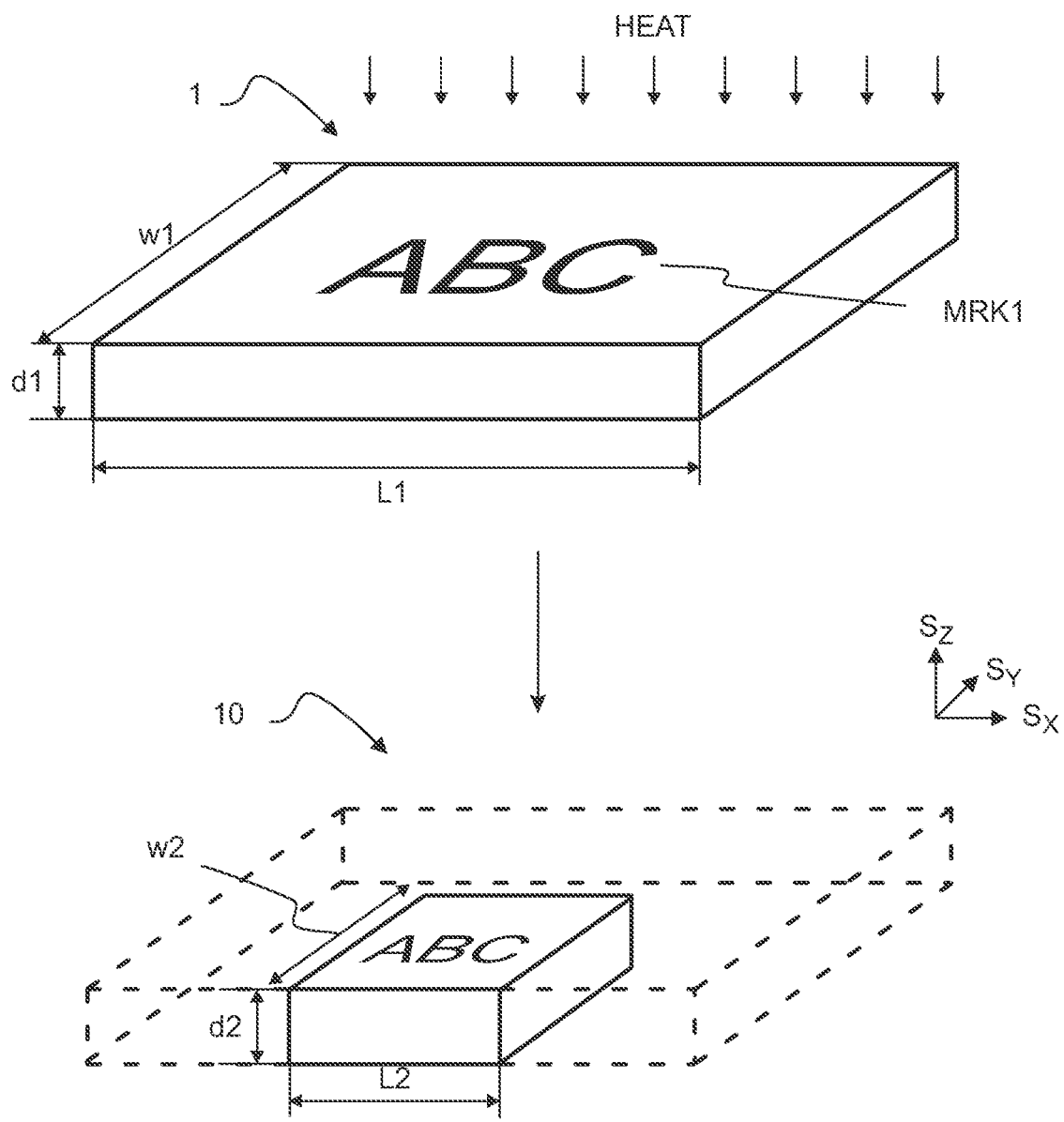
FIG. 1 shows, in a perspective view, an example embodiment of a heat shrinking of a plastic film.

Term "shrinkable" refers to a property of a plastic film to shrink under exposure to external energy. Referring to FIG. 1, a shrinkable face film, may shrink when exposure to an elevated temperature. Heat may be applied via washing liquid.

In response to application of heat, the heat shrinkable face film is arranged to shrink.

Term "wash-off label", also referred to as a washable label, refers to a label removable (detachable) from the surface of the item attached during subsequent washing process. At washing conditions comprising elevated temperatures, the adhesive bond between the label and the item the label is adhered to is weakened. The chemical effect of the washing solution may further promote the weakening of the adhesion. A wash-off label may comprise an adhesive layer sensitive to washing conditions. Wash-off labels may be used in labelling of beverage bottles. For example, beer and wine bottles, such as polyethylene terephthalate (PET) bottles and glass bottles.

Term "machine direction" MD refers to the running direction Sx of the face film or continuous label laminate during label manufacturing. "Transverse direction" TD or "cross direction" CD refers to the direction Sy perpendicular to the running direction Sx of the face film or label laminate. MD also equals direction DIR1 of the label attached on the surface of an item.

A ratio of total film thickness before and after stretching (orientation) is called a "stretch ratio" or "stretching ratio" (DR). It may also be referred to as an orientation ratio. Stretch ratio is a non-oriented (undrawn) film thickness in relation to the oriented (drawn) film thickness. The non-oriented film thickness is the thickness after extrusion and subsequent chilling of the film. When stretching the film, the thickness of the film may diminish in the same ratio as the film stretches or elongates. For example, a film having thickness of 100 micrometres before uniaxial orientation is stretched by a stretch ratio of 5. After the uniaxial orientation the film may have a fivefold diminished thickness of 20 micrometres. Thus, the stretch ratio (orientation ratio) is 5.

Oriented film, such as oriented face layer, may be provided, for example, by uniaxial or biaxial stretching. Due to the orientation, the face film exhibits shrinkability at elevated temperatures. Elevated temperature may be applied in the form of heated washing liquid. Shrinkable film is melt processed, such as extruded and subsequently stretched (oriented). The oriented film remains its state after cooling down i.e. internal stresses provided during stretching are locked into the film. The film is not annealed so as to release the internal stresses. However, it may be partially annealed or thermally treated so that at least some of the internal stresses are still remained in the film structure. When this film is again brought up to the elevated temperature at which the stress was induced and then fixed during its manufacture, this stress is released and the film shrinks back towards the non-stretched state. Depending on the orientation treatment applied, the film can be shrinkable both lengthwise and crosswise (film is called biaxially oriented), or mainly shrinkable in one direction (film is called uniaxially oriented).

With reference to FIG. 1, not heat set (annealed), biaxially oriented face film 1 having dimensions of length L1, width w1 and thickness d1, is arranged to shrink under application of heat so as to form a shrunk face film 10. Machine direction orientation direction $S_x$, of the film is parallel to the film length L1 and L2. Transverse direction orientation direction $S_y$, of the film is parallel to the film width w1 and w2. Under heating the biaxially oriented film 1 is capable of shrinking in the direction of the biaxial orientation i.e. both in machine direction and in transverse direction. In other words, the length of the film reduces, when heating is applied, i.e. L1>L2 and w1>w2. Same applies to the labels comprising biaxially oriented face film. Thickness d1 may remain essentially constant i.e. d1 is essentially equal with d2.

Referring to FIG. 2, a label 2 may comprise at least the following layers: a face film 1, an adhesive 4, and a print layer MRK1. The printing may be subsequently top coated or laminated in order to protect the printing. Alternatively or in addition, the reverse side of the face film adjacent to the adhesive layer 4 may be printed. Print layer is to be understood to include also decorations made by, for example, metallic or metallic like layers if such decorations are used in the label.

Figure 3:
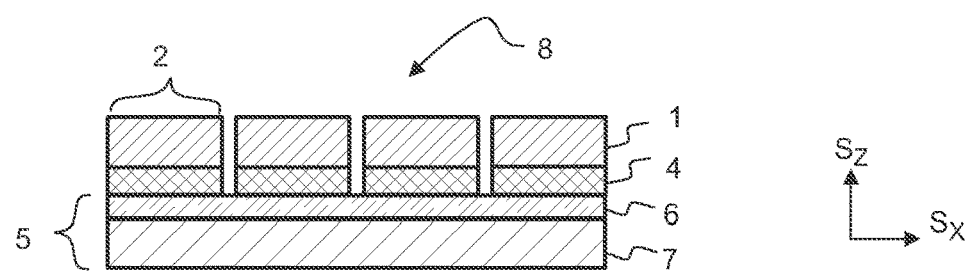
FIG. 3 shows an example embodiment of a label laminate comprising die-cut labels.

With reference to FIG. 3, a label laminate 8 comprises a face film 1, an adhesive layer 4, and further a release liner 7. Individual labels 2 are die-cut from the continuous label laminate. In the FIG. 3 a label laminate structure 8 comprises four die-cut labels 2 attached to a common release liner 5. The release line has a substrate 7 onto which a release coating layer 6, such as silicone, is applied. The release coating layer provides a non-adherent surface i.e. low adhesion and release effect against the adhesive layer. The face film and the release liner are typically laminated together having an adhesive layer in between, which laminated structure is referred to as a label laminate. The release liner is used to protect the adhesive layer. It also allows easier handling of the label to up to the point of labelling where the label face layer is dispensed and adhered to a surface of an item. In labelling the release liner is removed and disposed of and the label is attached onto the surface to be labelled through the adhesive layer. Thus, release liners of the label laminates serve one or more useful functions: they are used as a carrier sheet onto which the adhesive may be coated; they protect the adhesive layer during storage and transportation; they provide a support for labels during die-cutting and printing, and ultimately they release from the adhesive leaving it undamaged.

Labels may be used in wide variety of labelling applications and end-use areas, such as beverage labelling, food labelling, home and personal care product labelling, and labelling of industrial products. The surface of the labelled article may be for example plastic, glass, metal, or paper based. The labelled article may be for example a container, such as a bottle, jar, canister, can, tin or the like. The label may also be applied to semi-rigid or flexible packages used for e.g. packaging of food. Examples of articles include glass bottles, metal bottles, polyethylene terephthalate (PET) bottles, and bottles made of polyolefin, such as high density polyethylene (HDPE) and polypropylene (PP). The label may surround the labelled article, such as a bottle, completely or partially.

Face Film

A face film may be a monolayer. Alternatively it may have a multilayer structure including two or more layers. Multilayer structure may be provided through coextrusion so as to provide uniform film structure, wherein the adjacent film layers are in direct contact with each other.

A face film comprises thermoplastic polymer(s). Thermoplastic polymers include polyethylene terephthalate PET, polyvinyl chloride PVC, polystyrene PS, polypropylene PP, polyethylene PE, polylactic acid PLA and cyclic olefin copolymers COC. In an example, a face film comprises polyester, such as polyethylene terephthalate PET. PET may be modified. The modified PET may be glycol modified PETG. In PETG the ethylene glycol unit(s) of the polymer backbone may be replaced, for example, with cyclohexane dimethanol CHDM and/or neopentyl glycol NPG. Preferably, the face film comprises glycol modified polyethylene terephthalate PETG. The glycol modified polyethylene terephthalate PETG may have effect on flexibility of the film. It may also have effect on ability of the film to be oriented. Still further the modification may have effect on reducing the brittleness of the face film. PETG may have effect on avoiding the stress whitening of the face film, for example during application of the label. It may also have effect on transparency and clarity of the face film.

A face film may be transparent or clear. From the optical point of view, high transparency of the labels may be preferred. Transparent (clear) labels are substantially transparent to visible light. Transparent no label look appearance of the label is advantageous, for example, in applications where the objects beneath the label, i.e. the surface of a bottle, should be visible through the label. Clarity of the face film and a label comprising said face film can be measured and evaluated by the haze values. The haze of the face film may be lower than 25%, or lower than 10%, for example 2-6%, or 4-5%. Haze is tested according to standard ASTM D1003. When the haze of the label is low also the adhesives used should be clear or transparent.

Alternatively, a face film may be opaque and/or white. In an embodiment of an opaque face film, the face comprises additive to provide a desired colour. An additive may comprise one or more pigments or inorganic fillers, for example titanium dioxide, calcium carbonate and/or combination of those. In a multilayer film structure, the pigment may be included in one or more of the layers. As an example, a black face film is provided with additive carbon black. An opaque face layer may have an opacity of at least 70%, or at least 75%, or at least 80% when measured according to the standard ISO 2471. Opacity may be 70-95%, or preferably 70-80%. Alternatively, opacity may be less than 12%, when measured according to the standard ISO 2471.

A face film may be biaxially oriented. Biaxial orientation may be provided by using tenter frame line, wherein the film is first oriented in machine direction MD followed by transverse direction TD orientation. Alternatively, the film may be simultaneously oriented in both MD and TD. Simultaneous orientation may be provided, for example, using blowing technique. Preferably the film is not annealed after orientation so as to release the internal stresses. Alternatively, the film may be partially annealed or thermally treated so as to modify the amount of internal stresses and to provide controlled shrink properties. A face film may have asymmetric orientation. Asymmetric orientation refers to the degree of orientation being different in the two orienting directions. Biaxial asymmetric orientation without annealing and/or with controlled thermal treatment may have effect on providing predetermined and non-uniform shrinkage capability for the face film. Shrinkability may also be controlled through adjusting the orientation temperature. Orientation temperature may be adjusted within the glass transition temperature $T_g$ and the melting temperature $T_m$ of the polymer of the face film.

In an example, the face film may have draw ratio (orientation ratio or stretch ratio) from 2 to 10 (from 2:1 to 10:1), preferably from 3 to 9 (from 3:1 to 9:1), most preferably from 3 to 8 (from 3:1 to 8:1) in machine direction and in transverse direction. In an example, a draw ratio in transverse direction of the film may be 10 at the maximum. In an example, a draw ratio in machine direction may be 5 at the maximum.

According to an embodiment, a face film is designed to be biaxially stretched so as to achieve non-uniform shrinkage capability for the film. Alternatively, non-uniform shrinkage capability may be achieved by thermal post-treatment of the oriented film through modifying the amount of internal stresses created during orientation process. The non-uniform shrinkage may also be achieved through combination of biaxial stretching and thermal post-treatment. The biaxially oriented film or biaxially oriented and thermally post-treated film is arranged to shrink in its two orientation directions in non-uniform manner with a minimum shrink difference of at least 55%, preferably at least 60% or at least 70%. In other words, the amount of shrinkage in a first orientation direction and in a second orientation direction of the film differ from each other by at least 55%, preferably at least 60% or at least 70%.

The film has in both of its orientation directions minimum degrees of shrinkage which differ from each other by at least 55%, preferably at least 60% or at least 70% (based on the higher degree of shrinkage).

The difference between the shrinkage of the film in first direction and in second direction, namely the shrink difference, refers to a percentage value calculated by subtracting the lower shrinkage value from the higher shrinkage value, dividing the result of the subtraction by the higher shrinkage value, and finally, multiplying by 100. The first direction may refer to the machine direction or to the transverse direction. Same is true for the second direction.

For example, in a case the shrinkage in the first direction is 70% and the shrinkage in the second direction is 0.5%, the shrink difference is calculated as follows: (((70%−0.5%)/70%)×100)=99%.

For example, in a case the shrinkage in the first direction is 70%, then the shrinkage in the second direction has to be at most 31.5% in order to fall into the required shrink difference of at least 55%.

Generally higher draw ratio enables higher shrinkability. In an example, the face film may have difference in the orientation degree between the machine direction and the transverse direction. The difference may be more than 50%, for example between 50 and 95%.

According to an example, a heat shrink label film exhibits at least 20% shrinkage between temperature of 65 and 80° C. in a second direction of the label film. With reference to FIG. 1, the second direction is Sy i.e. transverse direction.

The difference in the shrinkage between the first direction and the second direction is equal to or more than 50%. Preferably, the difference in the shrinkage between the first direction and the second direction is equal to or more than 55%.

Below 65° C. shrinkage of the face film is less than 5%, preferably less than 2%, for example between 0 and 5%, or between 0.5 and 2%, in both directions Sx and Sy. Low shrinkage at temperatures below 65° C. may have effect on avoiding unwanted shrinkage of the labels during storage or during label converting steps, for example during printing.

According to an embodiment, a wash-off label comprises a label face film configured to shrink in a transverse direction between 20 and 80%, preferably between 35 and 70%, with the difference in the shrinkage between the transverse direction and the machine direction being at least 55%, when exposed to a caustic washing liquid at a temperature range between 65 and 85° C. for 5 minutes. In addition, the label film is configured to shrink less than 5% at temperature below 65° C. in both first and second directions.

In an example, a face film is exhibiting shrinkage in a transverse direction between 65 and 70% and in a machine direction less than 2%, when exposed to water bath of 85° C. for 10 seconds.

In an example, a face film is exhibiting shrinkage in a transverse direction 70% and in a machine direction less than 1%, when exposed to water bath of 85° C. for 10 seconds.

In an example, a face film is exhibiting shrinkage in a transverse direction at least 56% and in a machine direction less than 25%, when exposed to water bath of 80° C. for 10 seconds.

Shrinkage in the first direction or in the second direction never equals to 0%, when exposed to washing liquid comprising caustic soda and having temperature in the range of 65-85° C. for equal or less than 5 minutes.

Shrinkage may be measured according to the following method: providing a sample with measured and marked 100 mm*100 mm area, placing the sample for 5 minutes to the caustic washing liquids having temperatures at intervals of 5° C. from 55° C. to 95° C., cooling the sample at water bath having temperature of around room temperature, drying the sample and measuring the dimensions of the marked area of the sample. Preferably at least 3 or more parallel samples are used. Shrinkage is determined as the relative change of dimensions.

Biaxial orientation and subsequent shrinkage of the label face film may have effect on capability of the label to be washed off from the surface labelled. A shrinkage capability of the face film generating forces (shrink force) providing e.g. lifting the regions of the label away from the bottle may have effect on enabling more efficient and quick removal of the label from the surface of the item attached during washing process. Shrinkage of the face film applies stresses, such as contraction tension, on the adhesive bond between the adhesive layer and the surface of the item labelled thus enhancing or enabling the removal of the label from the surface labelled. Biaxial orientation and shrinkage of the film may allow reducing the wash-off time of the label when compared to annealed film or a monoaxially oriented film. The biaxial orientation and shrinkage of the film in two directions may have effect on removal profile of the label. For a mono-axially oriented shrinkable face film, when the relative shrinkage in the middle of the label decreases to close to zero, the last contact area will form a line perpendicular to the orientation direction. With a biaxially oriented film the last contact area is reduced and may be, for example, close to a single point.

Figure 4:
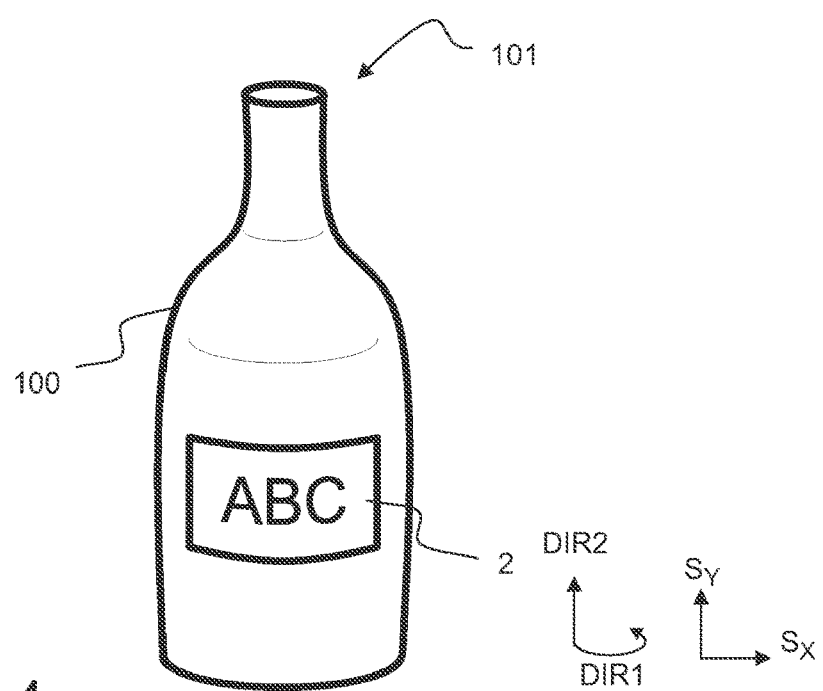
FIG. 4 shows a labelled item.

An asymmetric shrinkability of the biaxially oriented label film, has effect on performance of the label both in labelling phase and subsequent phase of label removal from the surface of the item labelled. Machine direction orientation has effect on providing adequate stiffness for the film in MD, thus enabling sufficient mechanical properties required in dispensing lines of the labels, wherein the labels are separated from the supporting liner and applied onto the surface of an item. Asymmetric orientation may have effect on providing both adequate stiffness but also efficient removability of the label form the surface attached. Asymmetric shrinkability and a higher shrinkage in transverse direction may also have effect on enhancing the separation of the label attached to a cylindrical bottle shape having convex surface. Asymmetric shrinkability may have effect on enhancing detachment of labels attached on a curved surface, as shown in FIG. 4. Torsional stiffness of a label along a curved, such as convex, surface in a machine direction DIR1 is less than in a transverse direction DIR2. Thus more stress is required enabling detachment of the label in the transverse direction when compared to the machine direction of the label 2. Asymmetric shrinkability providing asymmetric stresses may enable tailoring the detachment and allow more predetermined and symmetric detachment of the labels attached on a curved surface, such as a surface of a bottle.

Adhesive Layer

FIG. 4 shows a labelled item 101. A label 2 is attached onto the surface of an item 100. The label can be affixed to the surface of an item (article) 100 through an adhesive layer 4 so as to form a labelled item 101. Adhesive layer provides adhesion i.e. adheres or bonds the label to the surface of the item. The adhesive layer of the label should have a suitable adhesion i.e. tack (stickiness) in order to stick to an item during labelling process. Tack is the property of adhesive that allows the immediate formation of a bond on contact with another surface. The tackiness is needed at the point the label is attached to an item. The optimum adhesion between two materials depends on, for example, the wetting and surface energy of the materials.

An adhesive layer may be a continuous coating covering 100% of the face layer surface. Alternatively, it may be applied discontinuously as spots or strips covering less than 100% of the face layer surface. For example, the adhesive may cover between 10 to 90% of the total area of the face layer. Reduced amount of adhesive may have effect on reducing the time needed for the subsequent removal of the label during washing process from the surface of the item attached.

An adhesive layer may have a thickness in the range of about 5-40 μm, or in the range of about 8-20 μm. For example, the thickness of the adhesive layer is in the range of about 5-15 μm or 5-12 μm. The amount of the adhesive layer, in dry weight, may be in the range of about 5-40 $g/m^2$, or 8-20 $g/m^2$. The amount of the adhesive may be preferably less than 20 $g/m^2$, or equal or less than 15 $g/m^2$. For example, the amount of the adhesive layer is between 5 and 20 $g/m^2$ or between 5 and 15 $g/m^2$.

An adhesive layer may include permanent pressure sensitive adhesive, removable adhesive, such as soluble adhesive or dispersible adhesive.

According to an embodiment, an adhesive layer adjacent to the surface of the item labelled comprises or consists of a pressure sensitive adhesive(s) (PSA). A label comprising an adhesive layer of pressure sensitive adhesive may be referred to as a pressure sensitive adhesive (PSA) label. Pressure sensitive adhesive labels may also be referred to as self-adhesive labels. The labels consisting of PSA can be adhered to most surfaces through an adhesive layer without the use of a secondary agent, such as a solvent, or heat to strengthen the bond. The PSA forms a bond when pressure is applied onto the label at ambient temperature (e.g. between 15 and 35° C.), adhering the label to the item to be labelled. The adhesive layer may comprise at least one of the following: water based (water-borne) PSA, solvent based PSA and solid PSA. Solid PSAs are melted during application to the surface to be coated and may also be referred to as a hot-melt PSAs. In an example, the adhesive layer may comprise or consist of an acrylic adhesive, such as acrylic dispersion adhesives or acrylic UV hot-melt adhesives. Acrylic adhesive remains predominantly adhered to the film during the washing process. Alternatively the adhesive may be rubber based.

Label Removal

Labelled items, such as bottles, are generally reused or recycled several times. The labels comprising polymeric (plastic) face layer, in contrast to the paper based, have e.g. a superior wet strength and transparency, and they can be dispensed onto the bottles and other containers in standardised machines, without a need to work with separate adhesives, as for example in the case of the wet-glue paper label. Because polymeric labels do not possess the water permeability of the paper labels, the polymeric labels may be more difficult to remove completely with the existing washing process. Thus, there is a need for an improved label and face film structures so as to would an efficient and cost-effective recycling process of the labelled items.

In the washing process the label is detached from the labelled item, for example from the surface of the bottle. During washing process, the label is exposed to a heated washing liquid. In washing process comprising heated aqueous washing solution, the shrinkable face film is able to provide shrink force weakening the adhesion force of the adhesive layer thus detaching the adhesive label from the surface of the item attached. In addition, the adhesive layer 4 may lose its adhesion to at least some extent under the influence of washing conditions enabling and/or enhancing removal of the label from the surface of the item labelled. In an example, the adhesive layer may not dissolve in the washing liquid. The adhesive layer may be adhered to the face layer after removal of the label from the surface of an item.

The washing process may comprise an elevated temperature and an alkaline washing solution. Washing conditions of recyclable containers, such as glass containers, comprise temperatures in the range of 60-90° C. (degrees C.), or 65-85° C., or preferably at temperatures above 77° C. in aqueous solution. For polyester or plastic containers, the washing temperature may be 65-75° C., or even higher such as about 80° C. Washing liquid usually comprises caustic soda, for example sodium hydroxide. The washing liquid may be 1-4%, preferably 1-2% alkaline water. In one example the labelled items go into a pre-wash chamber at 50° C. for about one minute before they go into the washing chamber at 80° C.

The invention claimed is:

1. A wash-off label comprising
   a face film and
   an adhesive layer for adhering the label to the surface of an item to be labelled,
   wherein the face film is biaxially oriented plastic film,
   wherein the face film has an asymmetric orientation,
   wherein the face film is not annealed after orientation, and
   wherein the face film exhibits shrinkage in a transverse direction of at least 56% and in a machine direction of less than 25% when exposed to a water bath of 80° C. for 10 seconds.

2. A wash-off label according to claim 1, wherein the difference between the shrinkage of the film in machine direction and in transverse direction is at least 65%.

3. A wash-off label according to claim 1, wherein the biaxially oriented plastic film comprises glycol modified polyethylene terephthalate.

4. A wash-off label according to claim 1, wherein the biaxially oriented plastic film is a monolayer film.

5. A wash-off label according to claim 1, wherein the adhesive layer comprises permanent pressure sensitive adhesive.

6. A wash-off label according to claim 1, wherein the adhesive layer comprises acrylic dispersion adhesive or acrylic UV hot-melt adhesive.

7. An article comprising a wash-off label according to claim 1 adhered to the surface of the article.

8. An article according to claim 7, wherein the article is a beverage bottle.

9. A method comprising adhering the wash-off label according to claim 1 to a beverage bottle.

* * * * *